United States Patent
Van Rattinghe et al.

(10) Patent No.: US 11,350,361 B2
(45) Date of Patent: *May 31, 2022

(54) BATTERY OPERATED DEVICE, A CLOUD APPLICATION AND METHODS FOR TRANSMITTING/RECEIVING DATA MESSAGES OVER A LOW-POWER NETWORK

(71) Applicant: SENSOLUS NV, Ghent (BE)

(72) Inventors: Kristoff Van Rattinghe, Mariakerke (BE); Laurence Claeys, Ghent (BE); Johan Criel, Ghent (BE); Koen Van Vlaenderen, Alken (BE)

(73) Assignee: SENSOLUS NV, Ghent (BE)

( * ) Notice: Subject to any disclaimer, the term of this patent is extended or adjusted under 35 U.S.C. 154(b) by 51 days.

This patent is subject to a terminal disclaimer.

(21) Appl. No.: 17/093,934

(22) Filed: Nov. 10, 2020

(65) Prior Publication Data

US 2021/0084587 A1 Mar. 18, 2021

Related U.S. Application Data

(63) Continuation of application No. 15/535,348, filed as application No. PCT/EP2015/078048 on Nov. 30, 2015, now Pat. No. 10,863,434.

(30) Foreign Application Priority Data

Dec. 12, 2014 (EP) .................................. 14197721

(51) Int. Cl.
  *H04W 52/02* (2009.01)
  *H04L 12/12* (2006.01)
  *H04L 1/16* (2006.01)

(52) U.S. Cl.
  CPC ....... *H04W 52/0216* (2013.01); *H04L 1/1621* (2013.01); *H04L 1/1685* (2013.01);
  (Continued)

(58) Field of Classification Search
  None
  See application file for complete search history.

(56) References Cited

U.S. PATENT DOCUMENTS

| 6,775,707 B1 | 8/2004 | Bennett et al. |
| 2006/0039285 A1 * | 2/2006 | Chapman .............. H04L 69/163 370/235 |

(Continued)

FOREIGN PATENT DOCUMENTS

GB 2359225 A 8/2001

OTHER PUBLICATIONS

Extended European Search Report for corresponding European Application No. 14197721.5, Jun. 26, 2015.
(Continued)

*Primary Examiner* — Gregory B Sefcheck
*Assistant Examiner* — Amarnauth G Persaud
(74) *Attorney, Agent, or Firm* — Workman Nydegger

(57) ABSTRACT

A battery operated device, comprising a low throughput network interface sending said data messages to a cloud application over a low throughput connection. An acknowledgement receiver receiving from said cloud application over said low throughput connection and interpreting an acknowledgment message containing acknowledgement information for one or more of said data messages. Wherein said device further comprises an acknowledgement request generator generating and sending a request over the low throughput network to said cloud application for said acknowledgement message.

19 Claims, 4 Drawing Sheets

(52) U.S. Cl.
CPC ......... *H04L 12/12* (2013.01); *H04W 52/0229* (2013.01); *Y02D 30/70* (2020.08)

(56) References Cited

U.S. PATENT DOCUMENTS

| | | | |
|---|---|---|---|
| 2011/0116435 A1* | 5/2011 | Liu ................... | H04L 1/1685 370/312 |
| 2011/0295102 A1 | 12/2011 | Lakkis et al. | |
| 2014/0301208 A1* | 10/2014 | Merlin ............... | H04L 1/0029 370/236 |
| 2014/0361908 A1* | 12/2014 | Laird ................. | G01F 15/061 340/870.02 |
| 2015/0029863 A1* | 1/2015 | Lai .................... | H04W 28/0284 370/237 |
| 2015/0078366 A1 | 3/2015 | Trainin et al. | |
| 2015/0139051 A1 | 5/2015 | Gonia et al. | |
| 2015/0381776 A1* | 12/2015 | Seed ................... | H04L 67/16 709/203 |

OTHER PUBLICATIONS

International Search Report for corresponding International PCT Application No. PCT/EP2015/078048, Feb. 17, 2016.
"Low Throughput Networks (LTN); Functional Architecture", Group Specification, European Telecommunications Standards Institute (ETSI), Sep. 1, 2014, pp. 1-20, vol. LTN, No. V1.1.1.

* cited by examiner

BATTERY OPERATED DEVICE, A CLOUD APPLICATION AND METHODS FOR TRANSMITTING/RECEIVING DATA MESSAGES OVER A LOW-POWER NETWORK

FIELD OF THE INVENTION

The present invention relates to the field of low-power radio-frequency communications, and particularly in the field of Ultra-Narrow Band communications over Low Throughput Networks as defined for instance by the European Telecommunications Standards Institute Group Specifications.

BACKGROUND OF THE INVENTION

Low Throughput Network, also referred to as LTN, technology is a wide area bidirectional wireless network with some specific characteristics. LTN enables long-range data transmission, to distances up to several tens of kilometres in open field, and/or communication with buried underground equipment. Devices that communicate over LTN are typically battery operated. LTN operates with minimal power consumption allowing several years of operation without battery replacement even with standard batteries. This technology also implements low throughput along with advanced signal processing that provides effective protection against interferences. LTN is therefore particularly well suited for low throughput machine to machine communication where data volume is limited and low latency is not a strong requirement. Applications include remote measurement, smart metering for water, gas or electricity distribution or smart cities applications such as air pollution monitoring or public lighting communicating with various sensors such as smoke detectors, etc. Applications could also include a cooperation with cellular networks to address use cases where redundancy, complementary or alternative connectivity is needed.

In the LTN architecture, LTN access points and LTN end points communicate through a radio interface. Two implementations are foreseen to be included in the LTN architecture: UNB implementation which relies on Ultra-Narrow Band communication and OSSS implementation which uses Orthogonal Sequence Spread Spectrum technologies. The UNB or OSSS radio interface gives an increased transmission range with a limited amount of energy spent by endpoint. The UNB or OSSS allows large numbers of endpoints in a given cell without having spectrum interference. Uplinks and downlinks are possible with the UNB or OSSS solution.

A modulation scheme, known as LoRa, for Long Range, uses an Orthogonal Sequence Spread Spectrum based radio technology to connect devices to its network of base stations. The use of OSSS is key to providing a scalable, high-capacity network, with very low energy consumption, while maintaining a simple and easy to rollout star-based cell infrastructure. The network operates in the globally available Industrial, Scientific and Medical bands, also referred to as ISM bands, and co-exists in these frequencies with other radio technologies, but without any risk of collisions or capacity problems. LoRa currently uses the most popular European ISM band on 868 MHz as well as the 902-928 MHz band in the USA.

SIGFOX uses an Ultra Narrow Band based radio technology to connect devices to its global network. The use of UNB is key to providing a scalable, high-capacity network, with very low energy consumption, while maintaining a simple and easy to rollout star-based cell infrastructure. The network SIGFOX operates in the globally available ISM bands, and co-exists in these frequencies with other radio technologies, but without any risk of collisions or capacity problems. SIGFOX currently uses the most popular European ISM band on 868 MHz as well as the 902-928 MHz band in the USA, depending on specific regional regulations. Communication on SIGFOX is secured in many ways, including for example anti-replay, message scrambling, sequencing, etc. The most important aspect of transmission security is however that only the device vendors understand the actual data exchanged between the device and the Information Technology or IT systems. SIGFOX only acts as a transport channel, pushing the data towards the customer's IT system. An important advantage provided by the use of the narrow band technology is the flexibility it offers in terms of antenna design. On the network infrastructure end it allows the use of small and simple antennas, but more importantly, it allows devices to use inexpensive and easily customizable antennas.

The data integrity of unidirectional messages over a LTN significantly varies according to the geographical network coverage and the possible presence of local blind spots, to poor RF conditions or to high attenuation of the RF signal due to the location of the device, the speed of the device, the acceleration of the device, the forces of nature, to the congestion of the network infrastructure, to a technical failure or server outage, to the fact that the ISM band is used and needs to be shared with other devices, to strong RF interferences with other RF signals, etc. Blind spots can be encountered for example along the geographical path of a container on a truck, or a plane, or a boat, or of any other object whose geographical position changes in time. A device tracking the position of a moving container or a moving object sends a data message for example containing information indicative for the geographical position of the container or of the object. Due to the random presence of blind spots, the data message may not be received. The device therefore attempts retransmission of the data message multiple times to increase the chance that the message is received in order to compensate the possible presence of blind spots. These multiple retransmissions dramatically increase the power consumption of the device through an excessive and wasteful use of its battery, and therefore considerably reduce its battery life. There is furthermore no guarantee that unidirectional messages transmitted by the device are received, which strongly limits the achievable data integrity. Also, when using bidirectional messages, only a given number of bidirectional exchanges are available per day, which is insufficient for most applications that expect acknowledgement of up to hundreds messages that are transmitted per day.

The patent application US2011/0295102 from Tensorcom Inc., entitled "Systems and methods for networked wearable medical sensors", published on Dec. 1, 2011, describes a medical sensor system comprising a gateway and at least one wearable sensor. A wearable sensor transmits a sensor data frame to the gateway. After sending the sensor data frame, the sensor waits for a predetermined period and turns its narrow-band receiver on. The gateway is able to receive and demodulate the sensor data frame of the wearable sensor. The gateway then acknowledges receipt of the sensor data frame by transmitting an acknowledgment frame in return over the narrow band spectrum using a narrow band transmitter. In other words, the gateway generates and sends one acknowledgement frame per received sensor data frame, i.e. the gateway generates and sends as many acknowledgement frames as the number of sensor data frames it receives. The gateway sends acknowledgement frames for all received data frames. Battery power is consumed, also in case data integrity is not required at individual data message level. The narrow-band receiver of the wearable sensor must remain turned on—for example for several seconds or several minutes, or several hours—after the wearable sensor transmits a sensor data frame in order to receive an acknowledgement frame from the gateway for the respective sensor data frame. This increases the use of the battery of the wearable sensors and jeopardizes the long-term lifetime of the battery of the wearable sensor. Moreover, if a wearable sensor does not receive an acknowledgement within a given time-out period, the wearable sensor can wait for a random time and attempt retransmission of the positioning packet in a different time-slot. Messages are therefore retransmitted multiple times to increase the chance that the gateway receives it. This dramatically increases the power consumption of the wearable sensor through an excessive and wasteful use of its battery, and therefore considerably reduces the battery life of the wearable sensor. There is furthermore no guarantee that unidirectional messages transmitted by the wearable sensor are ever received by the gateway, which strongly limits the achievable data integrity.

It is an objective to disclose a device, a cloud application and the related methods that overcome the above identified shortcomings of existing solutions. More particularly, it is an objective to disclose such a device, a cloud application and methods for more reliably and more robustly providing the device with an acknowledgement of reception of messages transmitted by the device to the cloud application. It is a further objective to disclose such a device, a cloud application and the related methods that ensure the integrity of the transmitted messages, even when the geographical position of the device changes in time, without the need for multiple retransmissions of all the messages. It is a further objective to optimize the use of the battery of the device transmitting the messages in order to preserve its battery life. It is a further objective to disclose such a device, a cloud application and the related methods to acknowledge receipt of messages in a flexible, efficient, reliable and adaptive manner depending on the geographical network coverage and the battery level of the device.

SUMMARY OF THE INVENTION

According to a first aspect of the present invention, the above defined objectives are realized by a battery operated device for transmitting data messages, the device comprising:
a low throughput network interface, adapted to send the data messages to a cloud application over a low throughput connection;
an acknowledgement receiver, adapted to:
receive over the low throughput connection an acknowledgment message generated by the cloud application and containing acknowledgement information for one or more of the data messages; and
interpret the acknowledgement message;
CHARACTERIZED IN THAT the battery operated device further comprises an acknowledgement request generator adapted to generate and send a request over the low throughput network to the cloud application for the acknowledgement message.

In accordance with the present invention, the data integrity of the data messages during the transmission from a battery operated device to a cloud application is guaranteed whenever this is desired. Indeed, the battery operated device requests acknowledgement of the data messages the battery operated device sent to the cloud application. Upon receipt of the request, the cloud application sends acknowledgement messages containing information acknowledging receipt of data messages from the battery operated device. The acknowledgement messages generated by the cloud application are then interpreted by the battery operated device in order to identify data messages that were sent to the cloud application but not received by the cloud application, for example because of a poor geographical network coverage, the presence of local blind spots, poor RF conditions due to the location of the device, to the speed of the device, etc. This way, the battery operated device is aware of data messages that were not received by the cloud application and that need to be re-transmitted to guarantee data integrity whenever the battery operated device desires so. The battery operated device then selectively re-transmits data messages which reception was not acknowledged by the cloud application. Also, the use of the battery of the battery operated device is optimized in order to increase its lifetime. Indeed, the generation of the acknowledgement messages by the cloud application is triggered by the reception of a request generated by the battery operated device. For application for which receiving an acknowledgement message for all the data messages that were sent is not mandatory, the battery operated device does not send a request to the cloud application for acknowledgment of all the data messages. If the battery operated device decides to save battery, the battery operated device does not send a request. If the battery operated device decides to ensure data integrity of its transmission, the battery operated device decides when to send a request for acknowledgement to the cloud application. This prevents the cloud application from generating and sending an acknowledgement message to the battery operated device at a moment in time when the battery operated device is not available or not reachable, or when the low throughput network is busy, or when the application wherein the battery operated device is used does not require data integrity. This way, the communication ensures an acknowledgement message is received by the battery operated device when the battery operated device is available. This reduces the waste of the battery of the device as the battery operated device chooses the moment it listens to an acknowledgement message from the cloud application. The battery operated device therefore does not need to remain turned on to receive the acknowledgement message. Also, as the peak current in a device according to the present invention is for example much lower than for example in a phone, the design of the battery of such a device can be optimized and miniaturized, which drastically reduces the costs associated with its production. Also, the battery operated device only re-transmits data messages selectively according to the information contained in the acknowledgement message, and therefore does not need to re-transmit all the data messages multiple times. This drastically reduces the power consumption of the battery operated device and increases the battery life of the battery operated device. A battery of a device according to the present invention can indeed last several years, even tens of years. Flexibility is also provided to the communication between the battery operated device and the cloud application, as the battery operated device chooses when to send the request for an acknowledgement message. The transmission of the request can be programmed in time, or it can be scheduled depending on the number of data messages that have already been sent. The request initiates a bidirectional transfer procedure between the battery operated device and the cloud application. The cloud application can collect statistics on the number of re-transmissions, on the total number of messages transmitted by the battery operated device, etc.

The specifications of the low throughput network according to the present invention are understood as the specifications of the Low Throughput Network defined by the European Telecommunications Standards Institute and also referred to as ETSI LTN. The specifications of the ETSI LTN are listed in the Group Specification report describing the functional architecture of the LTN, entitled "ETSI GS LTN 002 V1.1.1" and published by the ETSI in September 2014. Properties of the low throughput network according to the present invention therefore comprise for example a throughput around 200 Bytes per day to 5 kBytes per day and/or a payload size of 12 Bytes, with a maximum of 255 Bytes and/or an instantaneous throughput between 10 and 1000 bps peak and with 50 kbps maximum and/or the ability to handle up to 10 connected objects per inhabitant and/or the ability to provide security functions between the low throughput network object and the platform of the application provider, such as spoofing, anti-theft, tempering, rolling code, etc. This is only one example of an LTN. Properties of the low throughput network according to the present invention also comprise future extensions of the properties of a low throughput network with respect to the current ETSI LTN standard and/or any future version of the specifications of the ETSI LTN standard. For example, the properties of a low throughput network could also comprise a throughput around 100 Bytes per day to 10 kBytes per day and/or a payload size of 6 Bytes, with a maximum of 510 Bytes and/or an instantaneous throughput between 5 and 500 bps peak and with 100 kbps maximum and/or the ability to handle up to 20 connected objects per inhabitant and/or the ability to provide security functions between the low throughput network object and the platform of the application provider, such as spoofing, anti-theft, tempering, rolling code, etc. This is only one example of a future LTN. In accordance with the present invention, a battery operated device is any suitable device with wireless data connectivity. A battery operated device can for example be a phone, a sensor, a detector, such as a smoke detector or a fire detector or a gas leak or water leak detector or a presence detector, or a location tracking device. The device can be operated by the battery of a car, of a train, of a truck, of a plane, of a bike, by USB batteries, by solar cells, etc. In accordance with the present invention, data messages can contain data indicative for a characteristic of the battery operated device, and/or data indicative for measurements performed by the battery operated device, for example the detected location of the battery operated device, a measured concentration of a given chemical component in gas phase, the detection of a movement in the vicinity of the battery operated device, etc. Alternatively, a data message does not contain any data as such, but is to be understood as a part of a protocol. In accordance with the present invention, acknowledgement messages are generated by the cloud application and are sent to the battery operated device over the low throughput connection. In accordance with the present invention, the acknowledgement request generator generates a request for acknowledgement messages containing acknowledgement information for the one or more sent data messages. The acknowledgement information for the data messages according to the present invention is for example the message identities of the data messages transmitted by the battery operated device and received by the cloud application. Alternatively, the acknowledgement information for the data messages is for example the messages identities of the data messages that were sent by the battery operated device and not received by the cloud application. Indeed, the cloud application may receive in the request sent by the battery operated information indicative for the data messages that were sent by the same battery operated device. The cloud application is able to identify the message identities of the data messages it received from the battery operated device and/or it may also be able to identify the message identities of the data messages that were sent by the battery operated device but that are missing. In accordance with the invention, the request is sent over the low throughput network.

According to an optional embodiment, the acknowledgement receiver is further adapted to receive and interpret a single acknowledgement message containing acknowledgement information for a plurality of the data messages.

This way, the lifetime of the battery of the device is further preserved. Indeed, the battery operated device receives a single acknowledgement message for a plurality of data messages, instead of receiving one acknowledgement message for each data message the battery operated device sent. This means the battery operated device does not use its battery to send a request and to receive an acknowledgement message after every transmission, but the battery operated device can choose when to receive a single acknowledgement message for a plurality of data messages the battery operated device sent. This optimizes the use of the battery of the battery operated device. The request may contain information indicative for the plurality of data messages for which an acknowledgement is desired, or the cloud application may automatically send acknowledgement for the plurality of data messages, e.g. the last data messages, for example the last 10 last messages or the last 64 last messages, all messages received within a time interval, for example within the last second, or within the last minute, or within the last hour, or within the last day, etc.

According to an optional embodiment, the request is one of the data messages.

This way, the request is sent over the low throughput network as one of the data messages. This facilitates the generation of the request by the battery operated device as the format of the request is similar to the format of any other data messages, and it also facilitates the interpretation of the request by the cloud application. Indeed, the cloud application does not need to convert a different format than the one of the data messages in order to interpret the request, which fastens and simplifies the interpretation of the cloud application.

According to an optional embodiment, one of said data messages comprises said request.

This way, the battery operated device does not need to generate an independent request as the request is already included in one of the data messages. This saves battery for the battery operated device.

According to an optional embodiment, the device further comprises:
  a message identity generator, adapted to generate a message identity for each of the data messages;
and wherein:
  the message identity is a numerical value.

This way, each unidirectional data message comprises a unique message identity. A suitable size and/or a suitable location of the message identity can be chosen arbitrarily depending on the application. For example, a 6 bit-long message identity can be used in order to maximize the efficiency of the communication on 8 byte bidirectional messages. A message identity is associated to each data message during the creation of the respective data message. The message identity is a numerical value that may for example be chosen from a list of available message identity values. For example, in the case of 6-bit long message identities, there exist $2^6$, i.e. 64, possible message identities for the data messages. For each data message in the case of 6-bit long message identities, the message identity generator choses one unique and available message identity amongst the 64 possible ones. For example, the value of the message identity of the first transmitted data message may be 0, the value of the message identity of the second transmitted data message may be 1, the value of the message identity of the third transmitted data message may be 2, and so forth. In this case, the numerical value of the message identity is an integer incremented by 1 for each next data message transmitted. Alternatively, the numerical value of the message identity is a numerical value incremented by a numerical value different than 1. Alternatively, in the case of 6-bit long message identities, the value of the message identity of the first transmitted data message may be 64, the value of the message identity of the second transmitted data message may be 63, the value of the message identity of the third transmitted data message may be 62, and so forth. In this case, the numerical value of the message identity is an integer decremented by 1 for each next data message transmitted. Alternatively, the numerical value of the message identity is a numerical value decremented by a numerical value different than 1. Alternatively, the numerical value of the message identity of a data message can be any random numerical value, and the allocation of the data message identity to the data message can be random so that the data message identity of the first transmitted data message is arbitrarily chosen, and the message identity of the second transmitted data message is also arbitrarily chosen and so forth. This way, each data message can be individually identified by the battery operated device and by the cloud application.

According to an optional embodiment:
  the request comprises a message identity count value indicative for the message identities of the data messages sent by the battery operated device; and
  the acknowledgement request generator is adapted to generate an acknowledgement message whose length in bits corresponds with the maximum message identity count value.

This way, the battery operated device is aware of the number of data messages that are transmitted to the cloud application and of the message identities of the data messages transmitted to the cloud application. The size and the location of the message identity count value can be arbitrarily chosen depending on the application. Also, the cloud application is adapted to retrieve the message identity count value from the request. The cloud application then becomes aware of the number of data messages that were sent by the battery operated device as well as of the message identities of the data messages that were transmitted. This improves the battery lifetime because it is a compact, encoded way to acknowledge receipt of a large number of messages with a single acknowledgement message. This improves the data integrity of the communication between the battery operated device and the cloud application, as the cloud application is able to compare the message identities of data messages it received to the message identities comprised in the message identity count value. If the cloud application does not find all the message identities comprised in the message identity count value back in the data messages it received, the cloud application concludes that some data messages that were sent by the battery operated device were not received by the cloud application. If the cloud application does find all the message identities comprised in the message identity count value back in the data messages it received, then the data integrity is ensured and is equal to 100%. To each message identity of the data messages sent by the battery operated device corresponds one bit in the acknowledgement message. For example, the encoding of the 8 bytes downlink message is formatted as one bit per message identity. Each location in the acknowledgement message corresponds to one message identity. The mapping of the message identities in the acknowledgement message is flexible and can be arbitrarily chosen. For example, 64 bits match the 6 bits message identity from unidirectional messages. This way, the interpretation of the acknowledgement message is made simple for the battery operated device as each bit of the acknowledgement message corresponds to one data message the battery operated device sent. For example, a bit equal to 1 in the acknowledgement message indicates that the data message has been received by the cloud application, and a bit equal to 0 in the acknowledgement message indicates that the data message has not been received by the cloud application.

According to an optional embodiment, the device further comprises:
  a received message identity extracting engine, adapted to extract message identities from the acknowledgement message and to identify message identities of the data messages missing in the acknowledgment message; and
wherein the battery operated device is further adapted to re-send a data message whose message identity is missing in the acknowledgement message.

This way, the battery operated device is able to extract from the acknowledgement message the message identities of the data messages that were not received by the cloud application. The battery operated device then selectively sends the missing data messages back to the cloud application. This saves the lifetime of the battery of the device as the device does not need to send all the data messages multiple times.

According to an optional embodiment, the device further comprises a device cache adapted to store the data messages, and wherein the device is further adapted to erase a data message for which receipt acknowledgement has been received.

This way, the battery operated device is able to store the data messages until the cloud application acknowledges reception of the same data messages. This optimizes the use of the cache at the side of the battery operated device as acknowledged data messages do not stay stored. This way, the message identities of the erased data messages become available again and can be attributed to new data messages. The remaining data messages that were not received by the cloud application are queued for transmission and do not see their message identities altered. Also, it allows the battery operated device to retrieve data messages at a later stage if necessary, so that the data messages can be re-transmitted if not received by the cloud application. For applications in which storing all the data messages in the device cache is not necessary, not all the data messages that were sent to the cloud application are stored in the cache. This saves processing power and further saves the battery lifetime of the device.

According to an optional embodiment, the device further comprises:

a device acknowledgement message generator, adapted to automatically generate a device acknowledgement message acknowledging receipt of the acknowledgement message and to send the device acknowledgement message to the cloud application.

This way, the cloud application becomes aware if the acknowledgement message is received by the battery operated device. This improves the reliability of the communication between the battery operated device and the cloud application as the cloud application receives a confirmation that the battery operated device is aware of the missing data messages. For example, the device acknowledgement message comprises 8 bits with configuration parameters. According to an alternative embodiment, a data message comprises the device acknowledgement message acknowledging receipt of the acknowledgment message.

According to an optional embodiment:

the battery operated device is further adapted to generate a configuration request to the cloud application;

the cloud application is further adapted to generate a configuration message containing information indicative for configuration parameters and to send the configuration message to the battery operated device;

the battery operated device is further adapted to generate a configuration acknowledgement message containing acknowledgement information for the configuration message.

The configuration request sent by the battery operated device to the cloud application comprises a configuration request to ask the cloud application if a configuration update is available. A bidirectional communication between the battery operated device and the cloud application is therefore initiated. Upon reception of the configuration request, the cloud application generates a configuration message comprising one or more configuration parameter and for example a unique configuration parameter identity. Upon reception of the configuration message, the battery operated device extracts the configuration parameter identity from the configuration message. The battery operated device then accepts the configuration message and confirms the reception of the configuration message if the extracted configuration parameter identity is correct, or rejects the configuration message if the extracted configuration parameter identity is not correct. To confirm the reception of the configuration message, the battery operated device generates a configuration acknowledgement message and sends this configuration acknowledgement message to the cloud application along with one or more data messages. The use of the configuration request makes the communication between the battery operated device and the cloud application very reliable and guarantees a data integrity up to 100%. Indeed, the reception of data messages generated by the battery operated device as well as the reception of configuration messages generated by the cloud application are acknowledged respectively by the cloud application and the battery operated device. For example, if the request sent by the battery operated device is not received by the cloud application, the battery operated device sends the configuration request again to the cloud application. Also, if for example the configuration message generated by the cloud application is not received by the battery operated device, the battery operated device is aware it did not receive a configuration message and therefore, the battery operated device sends the configuration request to the cloud application again. The cloud application then keeps on sending the same configuration message to the battery operated device. For example, if the battery operated device does not accept the configuration message, no configuration acknowledgement message indicative for reception of the configuration message is generated by the battery operated device. Upon reception of data messages from the battery operated device, the cloud application generates acknowledgement messages from which the battery operated device becomes aware whether or not data messages were received by the cloud application. If not, the data messages are sent again. For example, if the cloud application does not receive a request for acknowledgement messages, the battery operated device is aware of the fact that the cloud application did not receive it as the battery operated device itself does not receive acknowledgement messages. The battery operated device therefore sends the request for acknowledgement messages to the cloud application again. This way, the battery operated device and the cloud application are always aware that they are synchronized with each other.

According to a second aspect of the present invention, there is provided a method for transmitting data messages from a battery operated device, the method comprising the steps of:

sending the data messages to a cloud application over a low throughput connection; CHARACTERIZED IN THAT:

generating a request for an acknowledgement message indicative for receipt of one or more of the data messages;

sending the request for the acknowledgement message to the cloud application over the low throughput connection; and receiving the acknowledgement message over the low throughput connection and interpreting acknowledgement information contained therein.

In accordance with the present invention, the data integrity of the data messages during the transmission from a battery operated device to a cloud application is guaranteed whenever this is desired. Indeed, the battery operated device requests acknowledgement of the data messages the battery operated device sent to the cloud application. Upon receipt of the request, the cloud application sends acknowledgement messages containing information acknowledging receipt of data messages from the battery operated device. The acknowledgement messages generated by the cloud application are then interpreted by the battery operated device in order to identify data messages that were sent to the cloud application but not received by the cloud application, for example because of a poor geographical network coverage, the presence of local blind spots, poor RF conditions due to the location of the device, to the speed of the device, etc. This way, the battery operated device is aware of data messages that were not received by the cloud application and that need to be re-transmitted to guarantee data integrity whenever the battery operated device desires so. The battery operated device then selectively re-transmits data messages which reception was not acknowledged by the cloud application. Also, the use of the battery of the battery operated device is optimized in order to increase its lifetime. Indeed, the generation of the acknowledgement messages by the cloud application is triggered by the reception of a request generated by the battery operated device. For application for which receiving an acknowledgement message for all the data messages that were sent is not mandatory, the battery operated device does not send a request to the cloud application for acknowledgment of all the data messages. If the battery operated device decides to save battery, the battery operated device does not send a request. If the battery operated device decides to ensure data integrity of its transmission, the battery operated device decides when to send a request for acknowledgement to the cloud application. This prevents the cloud application from generating and sending an acknowledgement message to the battery operated device at a moment in time when the battery operated device is not available or not reachable, or when the low throughput network is busy, or when the application wherein the battery operated device is used does not require data integrity. This way, the communication ensures an acknowledgement message is received by the battery operated device when the battery operated device is available. This reduces the waste of the battery of the device as the battery operated device chooses the moment it listens to an acknowledgement message from the cloud application. The battery operated device therefore does not need to remain turned on to receive an acknowledgement message. Also, as the peak current in a device according to the present invention is for example much lower than for example in a phone, the design of the battery of such a device can be optimized and miniaturized, which drastically reduces the costs associated with its production. Also, the battery operated device only re-transmits data messages selectively according to the information contained in the acknowledgement message, and therefore does not need to re-transmit all the data messages multiple times. This drastically reduces the power consumption of the battery operated device and increases the battery life of the battery operated device. A battery of a device according to the present invention can indeed last several years, even tens of years. Flexibility is also provided to the communication between the battery operated device and the cloud application, as the battery operated device chooses when to send the request for an acknowledgement message. The transmission of the request can be programmed in time, or it can be scheduled depending on the number of data messages that have already been sent. The request initiates a bidirectional transfer procedure between the battery operated device and the cloud application. The cloud application can collect statistics on the number of re-transmissions, on the total number of messages transmitted by the battery operated device, etc.

According to a third aspect of the present invention, the above defined objectives are realized by a cloud application for receiving data messages sent by a battery operated device over a low throughput connection, the cloud application comprising:
  a low throughput network interface, adapted to receive the data messages from a battery operated device over a low throughput connection;
  an acknowledgement generator, adapted to generate and send an acknowledgment message containing acknowledgement information for one or more of the data messages over the low throughput connection;
CHARACTERIZED IN THAT the cloud application further comprises an acknowledgement request receiver adapted to receive a request over the low throughput connection for the acknowledgement message and wherein the acknowledgement generator is further adapted to generate the acknowledgement messages only upon receipt of the request.

In accordance with the present invention, the data integrity of the data messages during the transmission from a battery operated device to a cloud application is guaranteed whenever this is desired. Indeed, the battery operated device requests acknowledgement of the data messages the battery operated device sent to the cloud application. Upon receipt of the request, the cloud application sends acknowledgement messages containing information acknowledging receipt of data messages from the battery operated device. The acknowledgement messages generated by the cloud application are then interpreted by the battery operated device in order to identify data messages that were sent to the cloud application but not received by the cloud application, for example because of a poor geographical network coverage, the presence of local blind spots, poor RF conditions due to the location of the device, to the speed of the device, etc. This way, the battery operated device is aware of data messages that were not received by the cloud application and that need to be re-transmitted to guarantee data integrity whenever the battery operated device desires so. The battery operated device then selectively re-transmits data messages which reception was not acknowledged by the cloud application. Also, the use of the battery of the battery operated device is optimized in order to increase its lifetime. Indeed, the generation of the acknowledgement messages by the cloud application is triggered by the reception of a request generated by the battery operated device. For application for which receiving an acknowledgement message for all the data messages that were sent is not mandatory, the battery operated device does not send a request to the cloud application for acknowledgment of all the data messages. If the battery operated device decides to save battery, the battery operated device does not send a request. If the battery operated device decides to ensure data integrity of its transmission, the battery operated device decides when to send a request for acknowledgement to the cloud application. This prevents the cloud application from generating and sending an acknowledgement message to the battery operated device at a moment in time when the battery operated device is not available or not reachable, or when the low throughput network is busy, or when the application wherein the battery operated device is used does not require data integrity. This way, the communication ensures an acknowledgement message is received by the battery operated device when the battery operated device is available. This reduces the waste of the battery of the device as the battery operated device chooses the moment it listens to an acknowledgement message from the cloud application. The battery operated device therefore does not need to remain turned on to receive an acknowledgement message. Also, as the peak current in a device according to the present invention is for example much lower than for example in a phone, the design of the battery of such a device can be optimized and miniaturized, which drastically reduces the costs associated with its production. Also, the battery operated device only re-transmits data messages selectively according to the information contained in the acknowledgement message, and therefore does not need to re-transmit all the data messages multiple times. This drastically reduces the power consumption of the battery operated device and increases the battery life of the battery operated device. A battery of a device according to the present invention can indeed last several years, even tens of years. Flexibility is also provided to the communication between the battery operated device and the cloud application, as the battery operated device chooses when to send the request for an acknowledgement message. The transmission of the request can be programmed in time, or it can be scheduled depending on the number of data messages that have already been sent. The request initiates a bidirectional transfer procedure between the battery operated device and the cloud application. The cloud application can collect statistics on the number of re-transmissions, on the total number of messages transmitted by the battery operated device, etc.

According to an optional embodiment, wherein the acknowledgement generator is further adapted to generate a single acknowledgement message containing acknowledgement information for a plurality of the data messages.

This way, the lifetime of the battery of the device is preserved. Indeed, the battery operated device receives a single acknowledgement message for a plurality of data messages, instead of receiving one acknowledgement message for each data message the battery operated device sent. This means the battery operated device does not use its battery to receive an acknowledgement message after every transmission, but the battery operated device can choose when to receive a single acknowledgement message for a plurality of data messages the battery operated device sent. This optimizes the use of the battery of the battery operated device. It also reduces the power consumption of the cloud application that only generates a single acknowledgement message for a plurality of data messages. The costs associated with its implementation are therefore lowered.

According to an optional embodiment:
  a message identity extractor adapted to extract a message identity from each received data message;
  a request interpreter adapted to interpret the request and learn for which data message acknowledgement is requested;
and wherein the acknowledgement generator is further adapted to generate an acknowledgement message for data messages received.

This way, the battery operated device is aware of the number of data messages that are transmitted to the cloud application and of the message identities of the data messages transmitted to the cloud application. The size and the location of the message identity count value can be arbitrarily chosen depending on the application. Also, the cloud application is adapted to retrieve the message identity count value from the request. The cloud application then becomes aware of the number of data messages that were sent by the battery operated device as well as of the message identities of the data messages that were transmitted. This improves the data integrity of the communication between the battery operated device and the cloud application, as the cloud application is able to compare the message identities of data messages it received to the message identities comprised in the message identity count value. If the cloud application does not find all the message identities comprised in the message identity count value back in the data messages it received, the cloud application concludes that some data messages that were sent by the battery operated device were not received by the cloud application. If the cloud application does find all the message identities comprised in the message identity count value back in the data messages it received, then the data integrity is ensured and is equal to 100%. To each message identity of the data messages sent by the battery operated device corresponds one bit in the acknowledgement message. For example, the encoding of the 8 bytes downlink message is formatted as one bit per message identity. Each location in the acknowledgement message corresponds to one message identity. The mapping of the message identities in the acknowledgement message is flexible and can be arbitrarily chosen. For example, 64 bits match the 6 bits message identity from unidirectional messages. This way, the interpretation of the acknowledgement message is made simple for the battery operated device as each bit of the acknowledgement message corresponds to one data message the battery operated device sent. For example, a bit equal to 1 in the acknowledgement message indicates that the data message has been received by the cloud application, and a bit equal to 0 in the acknowledgement message indicates that the data message has not been received by the cloud application.

According to an optional embodiment, the cloud application further comprises a device acknowledgement message receiver adapted to receive a device acknowledgement message generated by the battery operated device containing acknowledgement information for the acknowledgement message.

This way, the cloud application becomes aware if the acknowledgement message is received by the battery operated device. This improves the reliability of the communication between the battery operated device and the cloud application as the cloud application receives a confirmation that the battery operated device is aware of the missing data messages. For example, the device acknowledgement message comprises 8 bits with configuration parameters. According to an alternative embodiment, a data message comprises the device acknowledgement message acknowledging receipt of the acknowledgment message. The cloud application becomes aware of reception of a first acknowledgement message when a second acknowledgement request from the battery operated device comprises a different message identity count value.

According to an optional embodiment, the cloud application is further adapted to:
  store a first message identity count value;
  store a first acknowledgement message sent to the battery operated device corresponding to the first message identity count value;
  upon reception of a second request from the battery operated device comprising a second message identity count value, send the first acknowledgement message back when the second message identity count value does not differ from the first message identity count value; and
  upon reception of a second request from the battery operated device comprising a second message identity count value, extract the message identities of the data messages received and generate a second acknowledgement message when the second message identity count value differs from the first message identity count value.

This way, the cloud application identifies if the battery operated device received the acknowledgement message. A battery operated device sends data message to the cloud application. The device then sends a request for acknowledgement of reception to the cloud application, wherein the request comprises a first message identity count value. The cloud application generates an acknowledgement message based on this first message identity count value. The battery operated device waits for the acknowledgement message containing information indicative for the receipt of data messages. There exists a network defined timeout window during which the acknowledgement message can be received by the battery operated device. If it times out, the bidirectional exchange between the battery operated device and the cloud application failed: the device is aware that it did not receive the acknowledgement message, but the cloud application is not. The battery operated device then tries to send the same message identity counter to the cloud application. The cloud application therefore receives a second acknowledgement request containing the first message identity count value and therefore becomes aware that the first acknowledgement message was not received by the battery operated device. The cloud application generates the correct acknowledgment message corresponding to the data messages for which acknowledgement of receipt was requested by the first acknowledgement request, i.e. for the data messages corresponding to the first message identity count value. When the acknowledgement message is correctly received by the battery operated device, the message identity count value of the next acknowledgement request is then different from the first message identity count value received by the cloud application. The cloud application then becomes aware that the acknowledgement message was well received by the battery operated device. The cloud application then knows for which newly received data messages acknowledgement is requested and therefore generates a correct acknowledgement message corresponding to the new message identity count value. This way, the data messages in the battery operated device and in the cloud application are kept in sync.

According to a fourth aspect of the present invention, there is provided a cloud method for receiving data messages from a battery operated device, the method comprising the steps of:

receiving the data messages over a low throughput connection;

receiving a request over the low throughput connection from a battery operated device for an acknowledgement message containing acknowledgement information for one or more of the data messages;

generating the acknowledgement message; and sending the acknowledgement message over the low throughput connection.

In accordance with the present invention, the data integrity of the data messages during the transmission from a battery operated device to a cloud application is guaranteed whenever this is desired. Indeed, the battery operated device requests acknowledgement of the data messages the battery operated device sent to the cloud application. Upon receipt of the request, the cloud application sends acknowledgement messages containing information acknowledging receipt of data messages from the battery operated device. The acknowledgement messages generated by the cloud application are then interpreted by the battery operated device in order to identify data messages that were sent to the cloud application but not received by the cloud application, for example because of a poor geographical network coverage, the presence of local blind spots, poor RF conditions due to the location of the device, to the speed of the device, etc. This way, the battery operated device is aware of data messages that were not received by the cloud application and that need to be re-transmitted to guarantee data integrity whenever the battery operated device desires so. The battery operated device then selectively re-transmits data messages which reception was not acknowledged by the cloud application. Also, the use of the battery of the battery operated device is optimized in order to increase its lifetime. Indeed, the generation of the acknowledgement messages by the cloud application is triggered by the reception of a request generated by the battery operated device. For application for which receiving an acknowledgement message for all the data messages that were sent is not mandatory, the battery operated device does not send a request to the cloud application for acknowledgment of all the data messages. If the battery operated device decides to save battery, the battery operated device does not send a request. If the battery operated device decides to ensure data integrity of its transmission, the battery operated device decides when to send a request for acknowledgement to the cloud application. This prevents the cloud application from generating and sending an acknowledgement message to the battery operated device at a moment in time when the battery operated device is not available or not reachable, or when the low throughput network is busy, or when the application wherein the battery operated device is used does not require data integrity. This way, the communication ensures an acknowledgement message is received by the battery operated device when the battery operated device is available. This reduces the waste of the battery of the device as the battery operated device chooses the moment it listens to an acknowledgement message from the cloud application. The battery operated device therefore does not need to remain turned on to receive an acknowledgement message. Also, as the peak current in a device according to the present invention is for example much lower than for example in a phone, the design of the battery of such a device can be optimized and miniaturized, which drastically reduces the costs associated with its production. Also, the battery operated device only re-transmits data messages selectively according to the information contained in the acknowledgement message, and therefore does not need to re-transmit all the data messages multiple times. This drastically reduces the power consumption of the battery operated device and increases the battery life of the battery operated device. A battery of a device according to the present invention can indeed last several years, even tens of years. Flexibility is also provided to the communication between the battery operated device and the cloud application, as the battery operated device chooses when to send the request for an acknowledgement message. The transmission of the request can be programmed in time, or it can be scheduled depending on the number of data messages that have already been sent. The request initiates a bidirectional transfer procedure between the battery operated device and the cloud application. The cloud application can collect statistics on the number of re-transmissions, on the total number of messages transmitted by the battery operated device, etc.

DETAILED DESCRIPTION OF EMBODIMENT(S)

Figure 1:
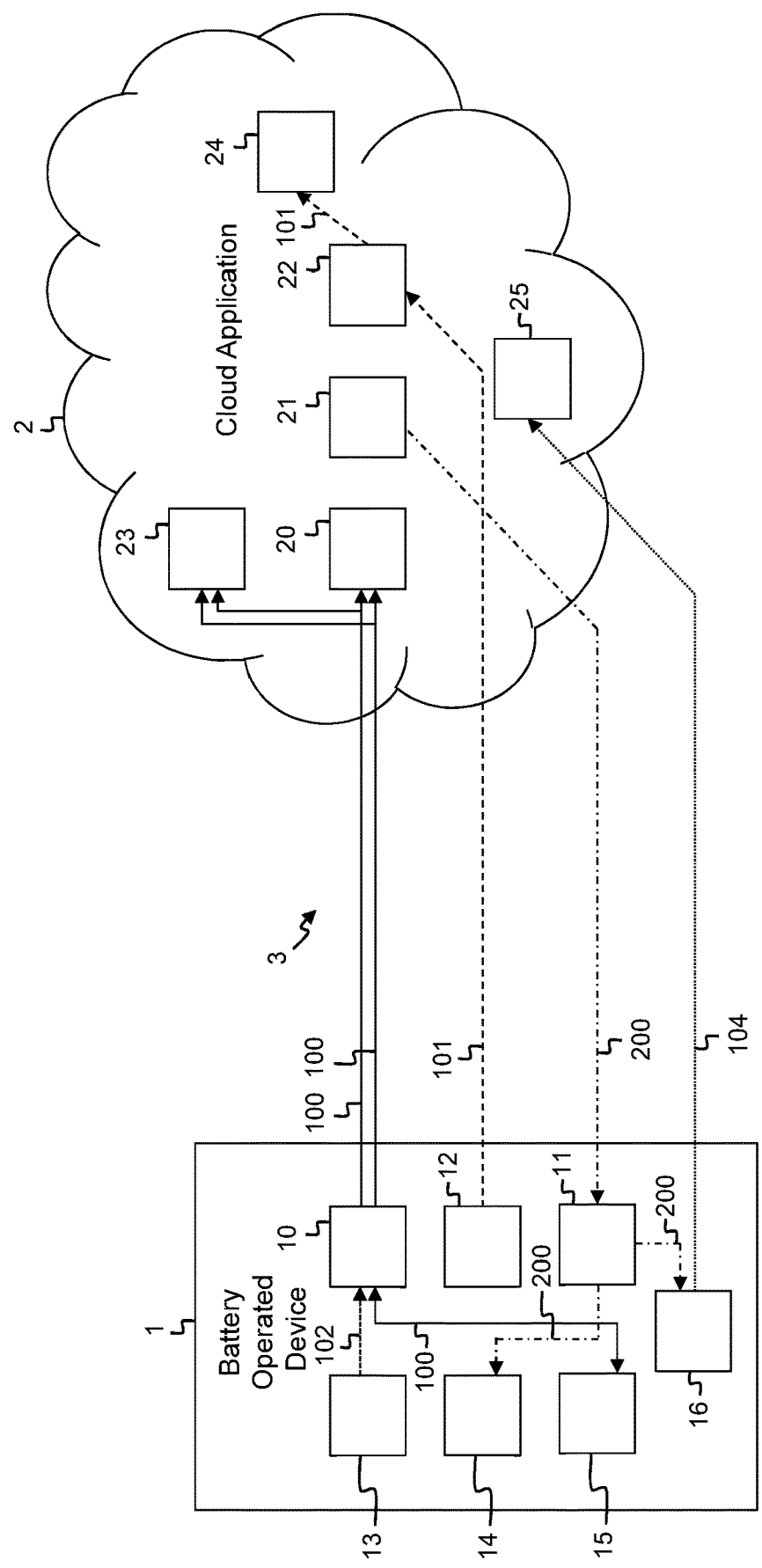
FIG. 1 schematically illustrates an embodiment of a battery operated device and a cloud application for acknowledging transmission of data messages over a low throughput network.

According to an embodiment shown in FIG. 1, a battery operated device 1 transmits a plurality of data messages 100 to a cloud application 2 over a low throughput network 3. The battery operated device 1 comprises a low throughput network interface 10, an acknowledgement receiver 11, an acknowledgement request receiver 12, a message identity generator 13, a message identity extracting engine 14, a device cache 15 and a device acknowledgement message generator 16. The cloud application 2 comprises a low throughput network interface 20, an acknowledgement generator 21, an acknowledgement request receiver 22, a message identity extractor 23, a request interpreter 24 and a device acknowledgement message receiver 25. Data messages 100 can for example be stored in the device cache 15 of the battery operated device 1. The low throughput network interface 10 is adapted to retrieve data messages 100 from the device cache 15. Alternatively, data messages 100 can be generated by the battery operated device 1. As depicted in FIG. 1, the low throughput network interface 10 is adapted to send two data messages 100 to the cloud application 2 over the low throughput network 3. According to an alternative embodiment, the battery operated device 1 transmits one data message 100 to the cloud application 2. According to a further alternative embodiment, the battery operated device 1 transmits tens or hundreds of data messages 100 to the cloud application 2. The message identity generator 13 generates a unique message identity 102 for each of the data messages 100. The low throughput network interface 20 of the cloud application 2 receives the data messages 100. The acknowledgement request generator 11 of the battery operated device 1 also generates and sends a request 101 to the cloud application 2 for an acknowledgement message from the cloud application 2. Alternatively, the request 101 is comprised in a data message 100. According to a further alternative embodiment, the request 101 is one of the data message 100. The request 101 is interpreted by the request interpreter 24 of the cloud application 2 so that the cloud application learns for which data messages 100 acknowledgement is requested. The message identity extractor 23 extracts the message identities 102 of each of the received data messages 100. Upon receipt of the request 101 by the acknowledgement request receiver 22, the acknowledgement generator 21 of the cloud application 2 generates an acknowledgement message 200 and sends it to the battery operated device 1. According to alternative embodiments, the cloud application 2 generates a plurality of acknowledgement messages 200. The acknowledgement message 200 contains information indicative for the receipt of the data messages 100. The acknowledgement message 200 is received by the acknowledgement receiver 11 of the battery operated device 1. The message identity extracting engine 14 interprets the acknowledgement message 200 by extracting the message identities 102 of the data messages 100 from the acknowledgement message 200. The message identity extracting engine 14 identifies the message identities 102 of the data messages 100 that were not received by the cloud application 2 and that are therefore contained in the information of the acknowledgement message 200. Alternatively, the message identity extracting engine 14 identifies the message identities 102 of the data messages 100 missing from the acknowledgement message 200 and interprets that the corresponding data messages 100 were not received by the cloud application 2. Upon receipt of the acknowledgement message 200, the acknowledgement generator 16 of the battery operated device 1 automatically generates a device acknowledgement message 104 acknowledging receipt of the acknowledgement message and sends the device acknowledgement message 104 to the cloud application 2. The device acknowledgement message receiver 25 receives and interprets the device acknowledgement message 104. The request 101 and the acknowledgement message 200 are sent over the low throughput network 3.

Figure 2:
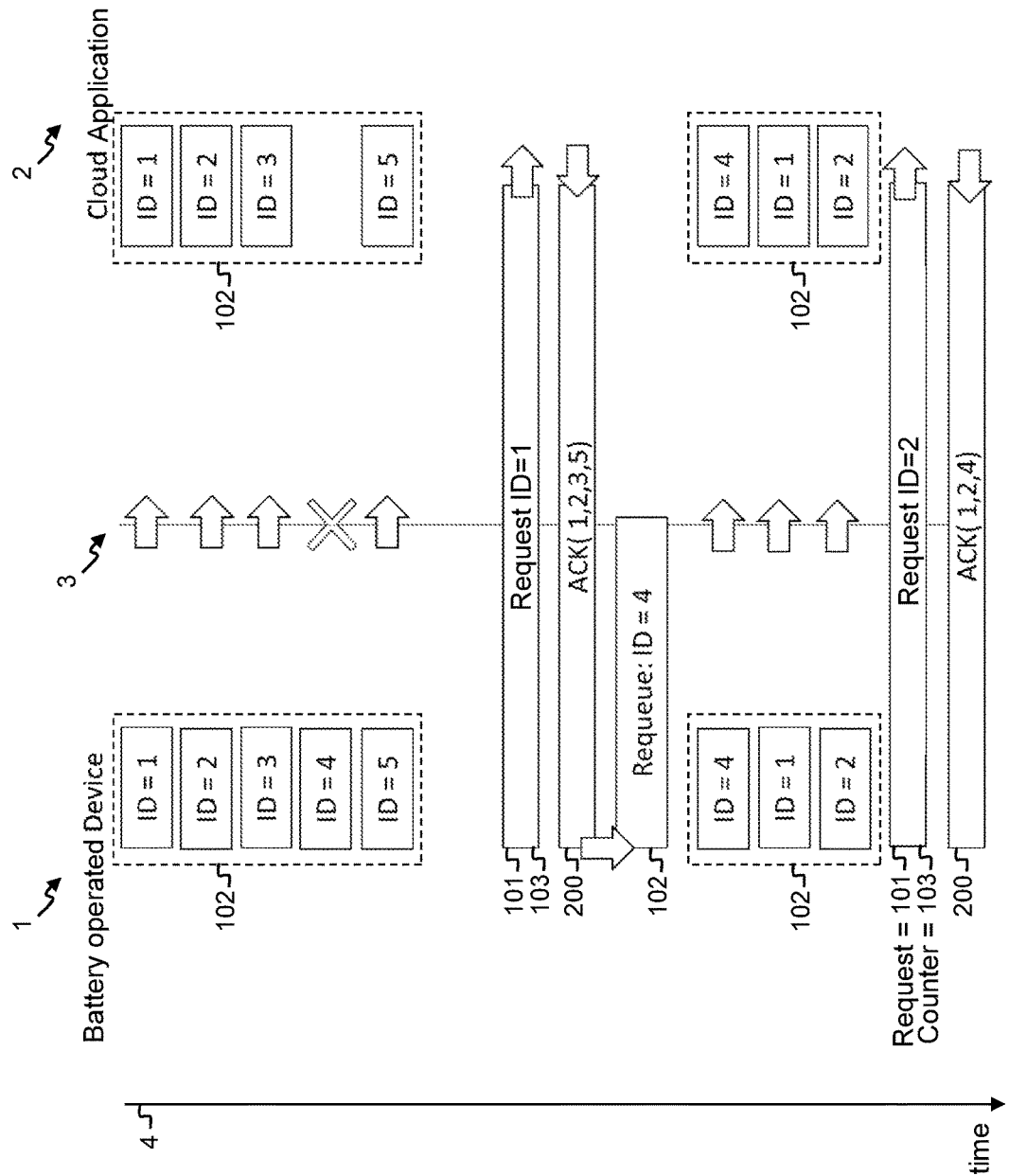
FIG. 2 schematically illustrates an embodiment of a battery operated device and a cloud application for acknowledging transmission of five data messages over a low throughput network, where one data message is not received by the cloud application.

According to an embodiment shown in FIG. 2, a battery operated device 1 sends data messages characterized by a message identity 102. A timeline 4 depicted in FIG. 2 indicates the chronology of the events of FIG. 2. To each data message is associated a message identity 102. As depicted in FIG. 2, the first data message has the message identity 102 labelled ID=1, the second data message has the message identity 102 labelled ID=2, etc until the fifth data message which has the message identity 102 labelled ID=5. The battery operated device 1 transmits these five data messages to the cloud application 2 over the low throughput network 3. The battery operated device 1 generates and sends a request 101 labelled ID=1 to the cloud application 2 in order to receive acknowledgement of receipt of the data messages from the cloud application 2. The request 101 labelled ID=1 comprises a message identity count value 103 comprising the message identities 102 of the data messages 100 that were sent by the battery operated device 1. Alternatively, the request 101 labelled ID=1 is comprised in a data message 100. According to an alternative embodiment, the request 101 labelled ID=1 is a data message 100. Upon receipt of the request 101, the cloud application 2 generates an acknowledgement message 200. According to an alternative embodiment, the cloud application 2 generates more than one acknowledgement message 200. The cloud application 2 receives data messages and extracts the message identities of the data messages it receives. As depicted in FIG. 2, the cloud application 2 identifies the message identities 102 labelled ID=1 to ID=5, except the message identity 102 labelled ID=4. This indicates that the data message corresponding to the message identity 102 labelled ID=4 is not received by the cloud application 2. The acknowledgement message 200 comprises the message identities 102 of the data messages that were received by the cloud application 2. As depicted in FIG. 2, the acknowledgement message 200 comprises the message identities labelled ID=1,2,3,5. According to an alternative embodiment, the acknowledgement message 200 comprises the message identities 102 of the data messages that were not received by the cloud application 2, i.e. the message identity 102 labelled ID=4. The battery operated device 1 receives the acknowledgement message 200 and interprets the acknowledgement message 200. In other words, the battery operated device 1 extracts the message identities 102 of the one or more data messages that were sent but that were not received by the cloud application 1. When the cloud application 2 acknowledges receipt of all the data messages that were sent by the battery operated device 1, the data integrity of the communication between the battery operated device 1 and the cloud application 2 is equal to 100%. The battery operated device 1 queues the one or more data messages corresponding to the missing message identities 102 for re-transmission. The battery operated device 1 then re-transmits three data messages corresponding to the message identities 102 labelled ID=1,2,4. The battery operated device 1 generates and sends a request 101 labelled ID=2 to the cloud application 2 in order to receive acknowledgement of receipt of the data messages from the cloud application 2. The request 101 labelled ID=2 comprises a message identity count value 103 comprising the message identities 102 of the data messages 100 that were re-transmitted by the battery operated device 1. Alternatively, the request 101 labelled ID=2 is comprised in a data message 100. According to an alternative embodiment, the request 101 labelled ID=2 is a data message 100. Upon receipt of the request 101, the cloud application 2 generates an acknowledgement message 200 containing the message identities 102 of the corresponding data messages that were received by the cloud application 2, i.e. the message identities 102 labelled ID=1,2,4.

Figure 3:
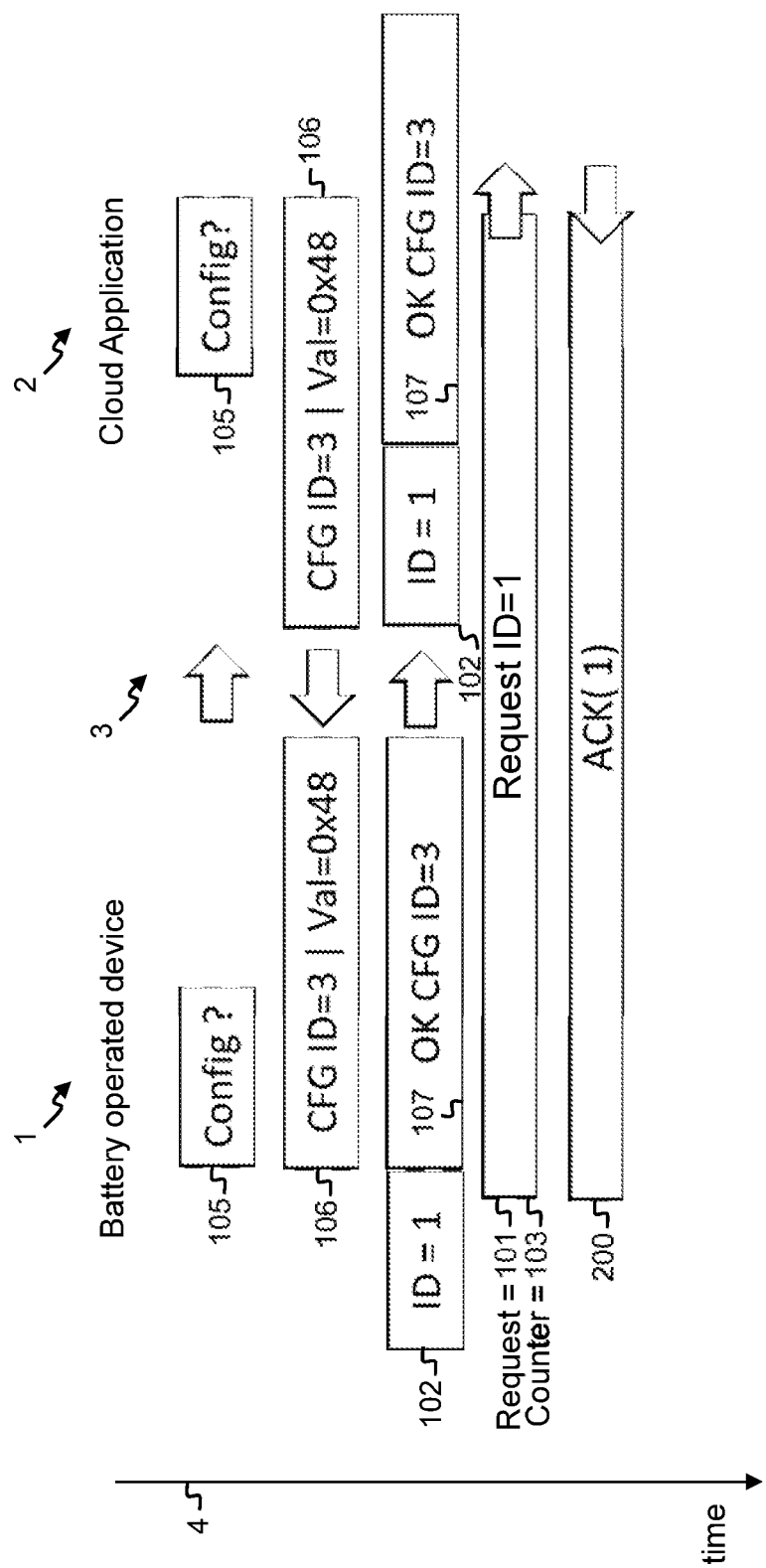
FIG. 3 schematically illustrates an embodiment of a battery operated device and a cloud application where the battery operated device sends a configuration request for a configuration update to the cloud application.

According to an embodiment shown in FIG. 3, a battery operated device 1 sends a configuration request 105 to the cloud application 2 to ask the cloud application 2 if a configuration update is available. The timeline 4 depicted in FIG. 3 indicates the chronology of the events of FIG. 3. The cloud application 2 generates a configuration message 106 and sends the configuration message 106 to the battery operated device 1. The configuration message 106 comprises a configuration parameter, such as for example DATA=0x48 that corresponds to the configuration update for the battery operated device 1. The configuration message 106 also comprises a unique configuration parameter identity, which is depicted in FIG. 3 as CFG ID=3. Upon reception of the configuration message 106, the device 1 extracts the configuration parameter identity and accepts the configuration message 106 if the configuration parameter identity is correct. The battery operated device 1 then generates a data message, labelled with a message identity ID=1 as depicted in FIG. 3 and also generates a configuration acknowledgement message 107 of reception of the configuration message 106. The configuration acknowledgement message 107 comprises the configuration parameter identity labelled ID=3. The battery operated device 1 sends the data message corresponding to the message identity 102 and the configuration acknowledgement message 107 to the cloud application 2. After a given amount of time or after sending a given number of data messages to the cloud application 2, the battery operated device 1 sends a request 101 to the cloud application 2 for acknowledgement messages 200. The request 101 comprises a message identity count value 103. Upon reception of the request 101, the cloud application 2 generates an acknowledgement message 200 acknowledging reception of the data message corresponding to the message identity 102 labelled ID=1.

Figure 4:
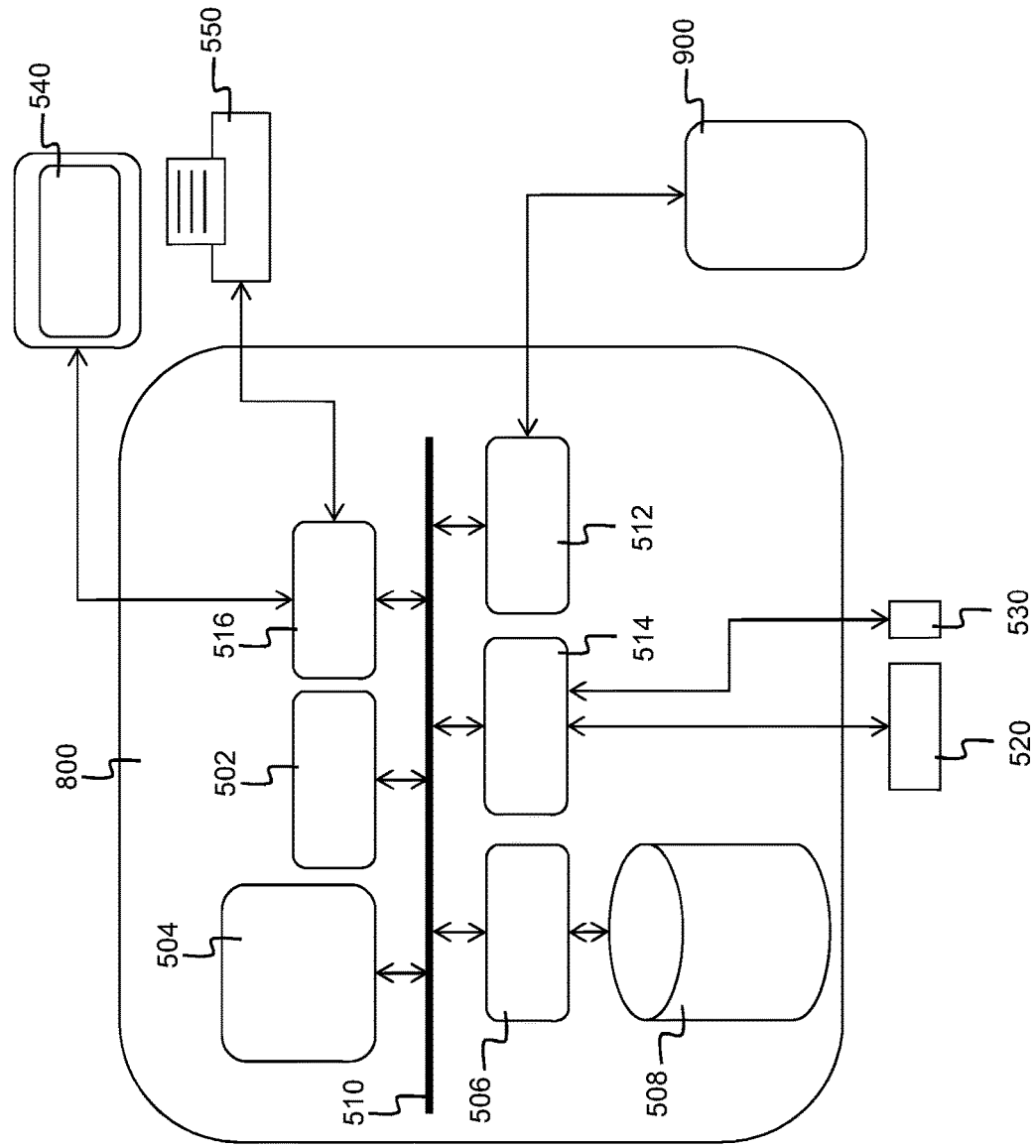
FIG. 4 schematically illustrates a suitable computing system for hosting the battery operated device or the cloud application of FIG. 1.

FIG. 4 shows a suitable computing system 800 for hosting the battery operated device 1 or the cloud application 2 of FIG. 1. Computing system 800 may in general be formed as a suitable general purpose computer and may comprise a bus 510, a processor 502, a local memory 504, one or more optional input interfaces 514, one or more optional output interfaces 516 a communication interface 512, a storage element interface 506 and one or more storage elements 508. Bus 510 may comprise one or more conductors that permit communication among the components of the computing system. Processor 502 may include any type of conventional processor or microprocessor that interprets and executes programming instructions. Local memory 504 may include a random access memory (RAM) or another type of dynamic storage device that stores information and instructions for execution by processor 502 and/or a read only memory (ROM) or another type of static storage device that stores static information and instructions for use by processor 504. Input interface 514 may comprise one or more conventional mechanisms that permit an operator to input information to the computing device 800, such as a keyboard 520, a mouse 530, a pen, voice recognition and/or biometric mechanisms, etc. Output interface 516 may comprise one or more conventional mechanisms that output information to the operator, such as a display 540, a printer 550, a speaker, etc. Communication interface 512 may comprise any transceiver-like mechanism such as for example two 1 Gb Ethernet interfaces that enables computing system 800 to communicate with other devices and/or systems, for example mechanisms for communicating with one or more other computing systems 900. The communication interface 512 of computing system 800 may be connected to such another computing system by means of a local area network (LAN) or a wide area network (WAN, such as for example the internet, in which case the other computing system 580 may for example comprise a suitable web server. Storage element interface 506 may comprise a storage interface such as for example a Serial Advanced Technology Attachment (SATA) interface or a Small Computer System Interface (SCSI) for connecting bus 510 to one or more storage elements 508, such as one or more local disks, for example 1 TB SATA disk drives, and control the reading and writing of data to and/or from these storage elements 508. Although the storage elements 508 above is described as a local disk, in general any other suitable computer-readable media such as a removable magnetic disk, optical storage media such as a CD or DVD, -ROM disk, solid state drives, flash memory cards, . . . could be used.

The battery operated device 1 or the cloud application 2 of FIG. 1 can be implemented as programming instructions stored it local memory 504 of the computing system 800 for execution by its processor 502. Alternatively battery operated device 1 or the cloud application 2 of FIG. 1 could be stored on the storage element 508 or be accessible from another computing system 900 through the communication interface 512.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A battery-operated device for transmitting data messages, said device comprising:
a low-power network interface, adapted to send said data messages to a cloud application over a connection;

a message identity generator, adapted to generate an arbitrary message identity for each of said data messages;
an acknowledgement receiver, adapted to:
receive over said connection an acknowledgment message generated by said cloud application and containing acknowledgement information for one or more of said data messages and wherein each location in said acknowledgement message corresponds to one of said message identities; and
interpret said acknowledgement messages;
wherein said battery-operated device further comprises an acknowledgement request generator adapted to generate and send a request independent from said data messages over said connection to said cloud application for said acknowledgement message;
wherein said battery-operated device further comprises a received message identity extracting engine, adapted to extract message identities from said acknowledgement message and to identify message identities of said data messages missing in said acknowledgment message; and
wherein said battery-operated device further
selectively re-transmits data messages whose message identity is missing in said acknowledgement message generated by said cloud application to guarantee data integrity of said data messages.

2. A battery-operated device according to claim 1, wherein said acknowledgement receiver is further adapted to receive and interpret a single acknowledgement message containing acknowledgement information for a plurality of said data messages.

3. A battery-operated device according to claim 1, wherein one of said data messages comprises said request.

4. A battery-operated device according to claim 1, wherein said request is one of said data messages.

5. A battery-operated device according to claim 1, wherein said message identity is a numerical value.

6. A battery-operated device according to claim 5, wherein:
said request comprises a message identity count value indicative for said message identities of said data messages sent by said battery-operated device; and
said acknowledgement request generator is adapted to generate an acknowledgement message whose length in bits corresponds with the maximum message identity count value.

7. A battery-operated device according to claim 1, wherein said device further comprises a device cache adapted to store said data messages, and wherein said device is further adapted to erase a data message for which receipt acknowledgement has been received.

8. A battery-operated device according to claim 1, wherein said device further comprises:
a device acknowledgement message generator, adapted to automatically generate a device acknowledgement message acknowledging receipt of said acknowledgement message and to send said device acknowledgement message to said cloud application.

9. A battery-operated device according to claim 1, wherein:
said battery-operated device is further adapted to generate a configuration request to said cloud application;
said cloud application is further adapted to generate a configuration message containing information indicative for configuration parameters and to send said configuration message to said battery-operated device;

said battery-operated device is further adapted to generate a configuration acknowledgement message containing acknowledgement information for said configuration message.

10. A battery-operated device according to claim 1, wherein said data integrity is guaranteed by ensuring the data integrity at 100%.

11. A battery-operated device according to claim 1, wherein said data integrity is guaranteed by ensuring the data integrity up to 100%.

12. A battery-operated device according to claim 1, wherein the battery-operated device does not need to re-transmit all said data messages multiple times.

13. A battery-operated device according to claim 1, wherein said data integrity is guaranteed by guaranteeing the data integrity of the payload communicated between the battery-operated device and the cloud application.

14. A method for transmitting data messages from a battery-operated device, said method comprising the steps of:
generating an arbitrary message identity for each of said data messages;
sending said data messages to a cloud application over a connection;
generating a request independent from said data messages for an acknowledgement message indicative for receipt of one or more of said data messages;
sending said request for said acknowledgement message to said cloud application over said connection;
receiving over said connection said acknowledgement message generated by said cloud application and containing acknowledgement information for one or more of said data messages, wherein each location in said acknowledgement message corresponds to one of said message identities;
extracting message identities from said acknowledgement message and to identify message identities of said data messages missing in said acknowledgment message; and
selectively re-transmitting data messages whose message identity is missing in said acknowledgement message to guarantee data integrity of said data messages.

15. A computing system comprising:
one or more processors; and
one or more computer-readable mediums having stored thereon executable instructions that when executed by the one or more processors configure the computing system to implement a cloud application for receiving data messages sent by a battery-operated device over a connection; and
a low-power network interface, adapted to receive said data messages from a battery-operated device over the connection, wherein each of said data messages comprises an arbitrary message identity;
wherein said cloud application comprises an acknowledgement generator, adapted to generate and send an acknowledgment message containing acknowledgement information for one or more of said data messages over said connection, wherein each location in said acknowledgement message corresponds to one of said message identities;
wherein said cloud application further comprises an acknowledgement request receiver adapted to receive a request independent from said data messages over said connection for said acknowledgement message and wherein said acknowledgement generator is further adapted to generate said acknowledgement messages only upon receipt of said request; and wherein said cloud application is further configured to receive again data messages which are selectively re-transmitted by said battery-operated device when their message identities are missing in said acknowledgement message to guarantee data integrity of said data messages.

16. The computing system according to claim 15, wherein said acknowledgement generator is further adapted to generate a single acknowledgement message containing acknowledgement information for a plurality of said data messages.

17. The computing system according to claim 15, wherein said cloud application comprises:

a message identity extractor adapted to extract a message identity from each received data message;

a request interpreter adapted to interpret said request and learn for which data message acknowledgement is requested; and wherein said acknowledgement generator is further adapted to generate an acknowledgement message for data messages received.

18. The computing system according to claim 15, wherein said cloud application further comprises a device acknowledgement message receiver adapted to receive a device acknowledgement message generated by said battery-operated device containing acknowledgement information for said acknowledgement message.

19. The computing system according to claim 18, wherein said cloud application is further adapted to:

store a first message identity count value;

store a first acknowledgement message sent to said battery-operated device corresponding to said first message identity count value;

upon reception of a second request from said battery-operated device comprising a second message identity count value, send said first acknowledgement message back when said second message identity count value does not differ from said first message identity count value; and upon reception of a second request from said battery-operated device comprising a second message identity count value, extract said message identities of said data messages received and generate a second acknowledgement message when said second message identity count value differs from said first message identity count value.

* * * * *